(12) United States Patent
Caliendo, Jr. et al.

(10) Patent No.: US 9,728,164 B2
(45) Date of Patent: Aug. 8, 2017

(54) MOVING A TILE ACROSS MULTIPLE WORKSPACES

(75) Inventors: Neal Robert Caliendo, Jr., Raleigh, NC (US); Lisa Louise Carter, Durham, NC (US); Russell Stuart Gantman, Fuquay-Varina, NC (US); Paul Plaskonos, Raleigh, NC (US); Adam Miles Smith, Chapel Hill, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 958 days.

(21) Appl. No.: 13/118,840

(22) Filed: May 31, 2011

(65) Prior Publication Data

US 2012/0311485 A1     Dec. 6, 2012

(51) Int. Cl.
| | | |
|---|---|---|
| G06F 17/00 | (2006.01) | |
| G09G 5/14 | (2006.01) | |
| G06F 3/0488 | (2013.01) | |
| G06F 3/0486 | (2013.01) | |
| G09G 5/34 | (2006.01) | |

(52) U.S. Cl.
CPC ............. *G09G 5/14* (2013.01); *G06F 3/0486* (2013.01); *G06F 3/0488* (2013.01); *G06F 2203/04806* (2013.01); *G09G 5/34* (2013.01)

(58) Field of Classification Search
CPC ............. G06F 3/04817; G06F 3/04842; G06F 3/0486; G06F 3/0488
See application file for complete search history.

(56) References Cited

U.S. PATENT DOCUMENTS

| 5,740,389 A | * | 4/1998 | Li et al. ...................... 715/769 |
|---|---|---|---|
| 6,628,309 B1 | * | 9/2003 | Dodson et al. .............. 715/769 |
| 6,710,788 B1 | * | 3/2004 | Freach et al. ................. 715/778 |
| 7,725,839 B2 | * | 5/2010 | Michaels ...................... 715/836 |
| 8,276,095 B2 | * | 9/2012 | Cutler et al. .................. 715/804 |
| 8,661,369 B2 | * | 2/2014 | Heo ...................... G06F 3/0481 340/10.1 |
| 9,043,731 B2 | * | 5/2015 | Luna .................... G06F 3/04815 715/848 |
| 2003/0028269 A1 | * | 2/2003 | Spriggs et al. ................ 700/83 |

(Continued)

OTHER PUBLICATIONS

Windows 7 Operating System, Copyright 2009.*

(Continued)

*Primary Examiner* — Keith Bloomquist
(74) *Attorney, Agent, or Firm* — John L. Rogitz; John M. Rogitz

(57) ABSTRACT

According to one disclosed embodiment, an approach is provided in which a multi-workspace request is received at a machine while the machine is operating in a single workspace mode and while the machine is displaying a first single workspace on a display screen accessible by the machine. The machine includes a number of single workspaces and each of the single workspaces has spaces to display a number of tiles that each correspond to an application. A multi-workspace mode is displayed on the display screen, with the displaying of the multi-workspace mode including displaying a set of the single workspaces on the display screen. Each of the set of single workspaces is displayed in a reduced size in comparison to the single workspace mode.

21 Claims, 5 Drawing Sheets

(56) References Cited

U.S. PATENT DOCUMENTS

| | | | |
|---|---|---|---|
| 2003/0179240 A1* | 9/2003 | Gest ............................... | 345/779 |
| 2003/0189597 A1* | 10/2003 | Anderson et al. ............ | 345/778 |
| 2008/0028321 A1* | 1/2008 | Weksler et al. ............... | 715/748 |
| 2010/0149096 A1* | 6/2010 | Migos et al. ................. | 345/158 |
| 2011/0004839 A1* | 1/2011 | Cha et al. .................... | 715/765 |
| 2011/0087982 A1* | 4/2011 | McCann et al. .............. | 715/769 |
| 2012/0096396 A1* | 4/2012 | Ording .................. G06F 9/4443 |  |
| | | | 715/799 |

OTHER PUBLICATIONS

Mega-Mini Desktop Windows 95, submitted Dec. 13, 2009, published by DeviantArt at http://master-bit.deviantart.com/art/Mega-Mini-Desktop-windows-95-146671230.*

* cited by examiner

MOVING A TILE ACROSS MULTIPLE WORKSPACES

BACKGROUND

The present disclosure relates to an approach that allows manipulation of visual graphical user interfaces and elements across and within multiple workspaces.

Pervasive, generally portable, information handling systems such as mobile telephones (e.g., "smart phones," etc.) provide increasing amounts of performance and power in small, generally handheld, form factors. Software applications are represented as visual graphical user interface objects called "tiles" on the pages, or workspaces, provided by the information handling system. Due to the generally small size of the display screen, especially in comparison with large desktop displays, multiple pages (workspaces) are often utilized in order for the user to be able to visually distinguish between tiles. Tiles are graphic user interfaces that often also provide small textual titles that describe the underlying application. In addition, these pervasive information handling system often use touch-enabled screens to save space without providing traditional keypads or keyboards as generally found as accessories in laptop and desktop computer systems. Users often organize workspaces by placing related applications on a common page. For example, a user may have a workspace of games, another workspace with utilities, another workspace with entertainment, and the like.

BRIEF SUMMARY

According to one disclosed embodiment, an approach is provided in which a multi-workspace request is received at a machine while the machine is operating in a single workspace mode and while the machine is displaying a first single workspace on a display screen accessible by the machine. The machine includes a number of single workspaces and each of the single workspaces has spaces to display a number of tiles that each correspond to an application. A multi-workspace mode is displayed on the display screen, with the displaying of the multi-workspace mode including displaying a set of the single workspaces on the display screen. Each of the set of single workspaces is displayed in a reduced size in comparison to the single workspace mode.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
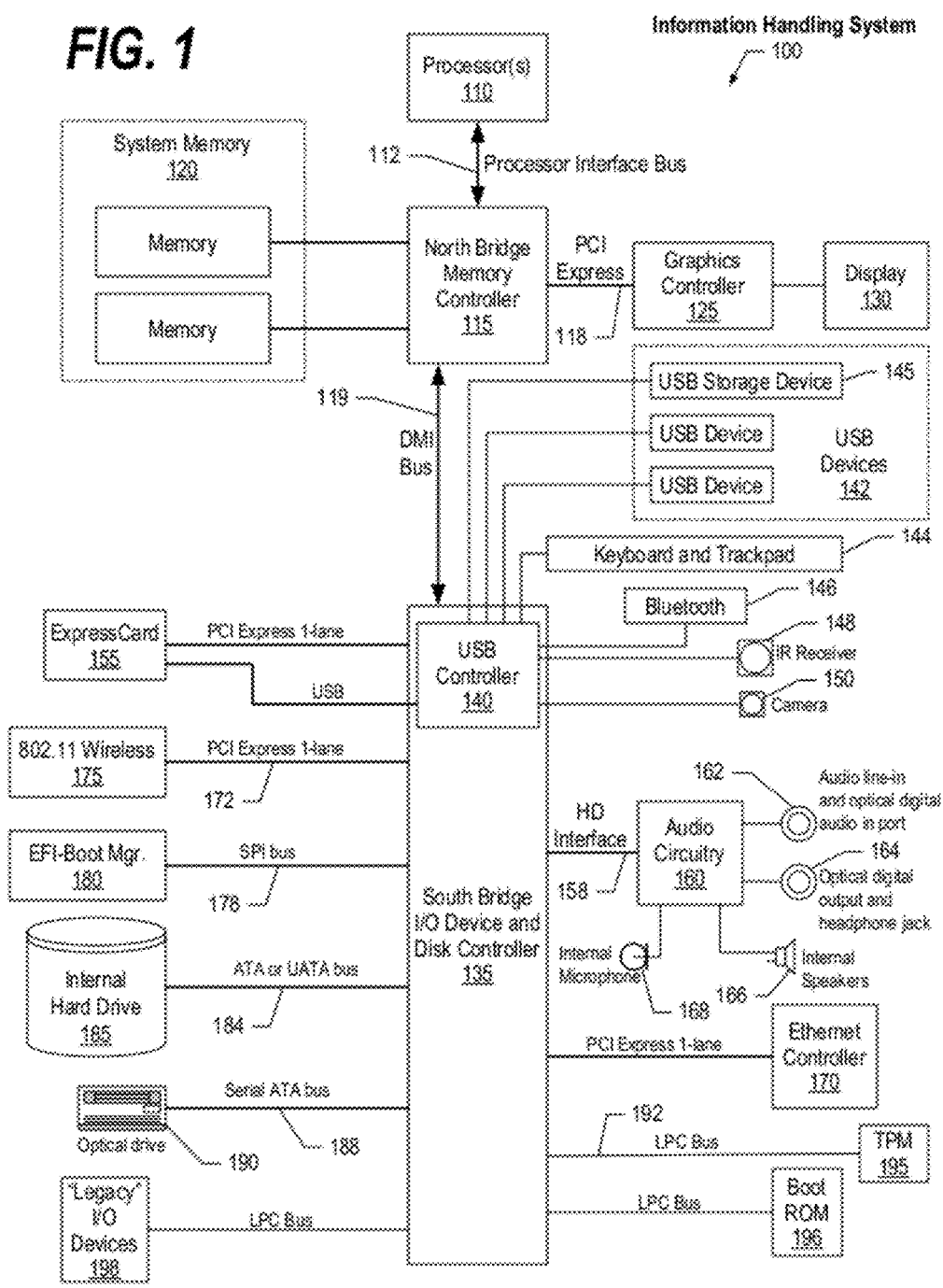
FIG. 1 is a block diagram of a data processing system in which the methods described herein can be implemented.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 2:
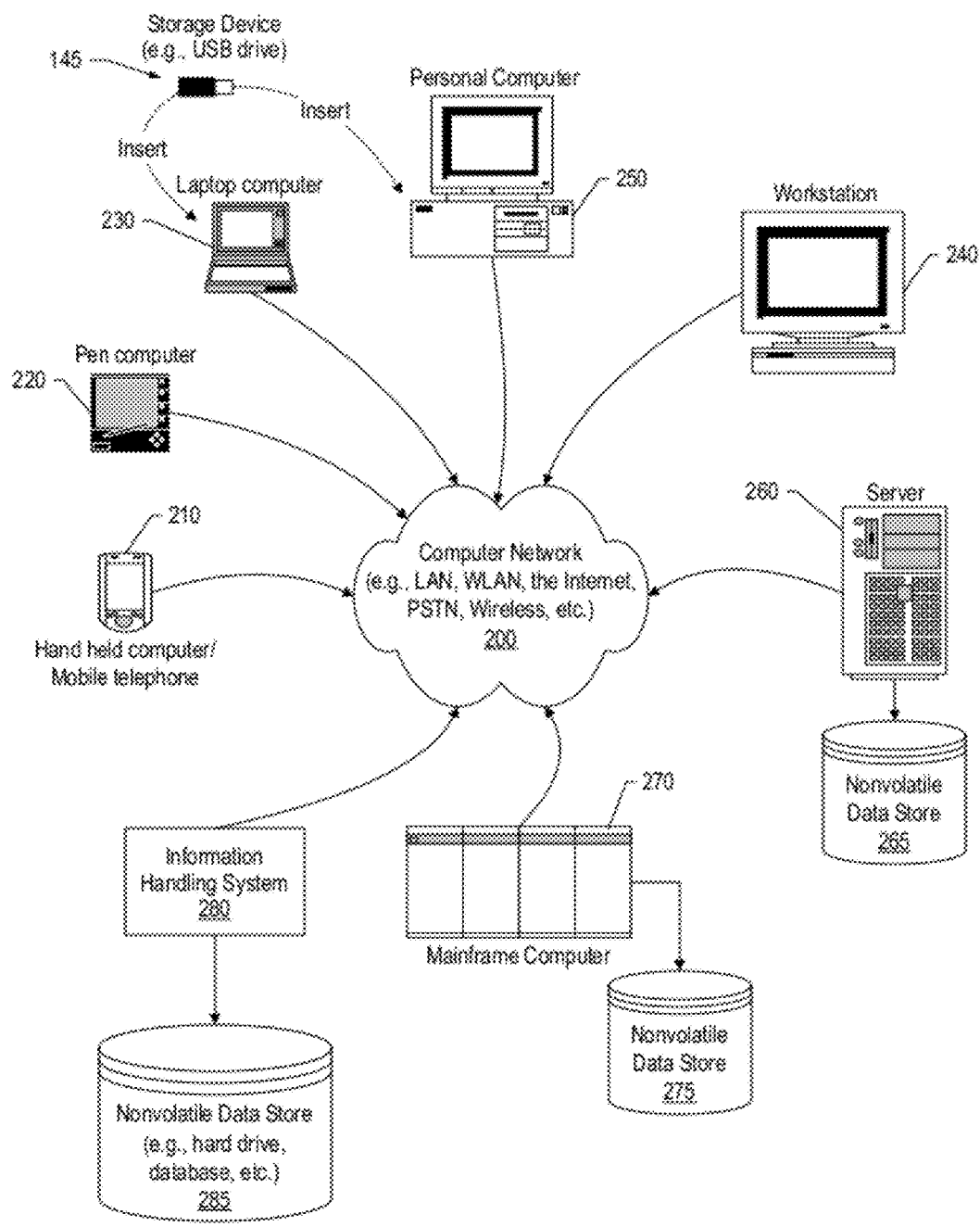
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
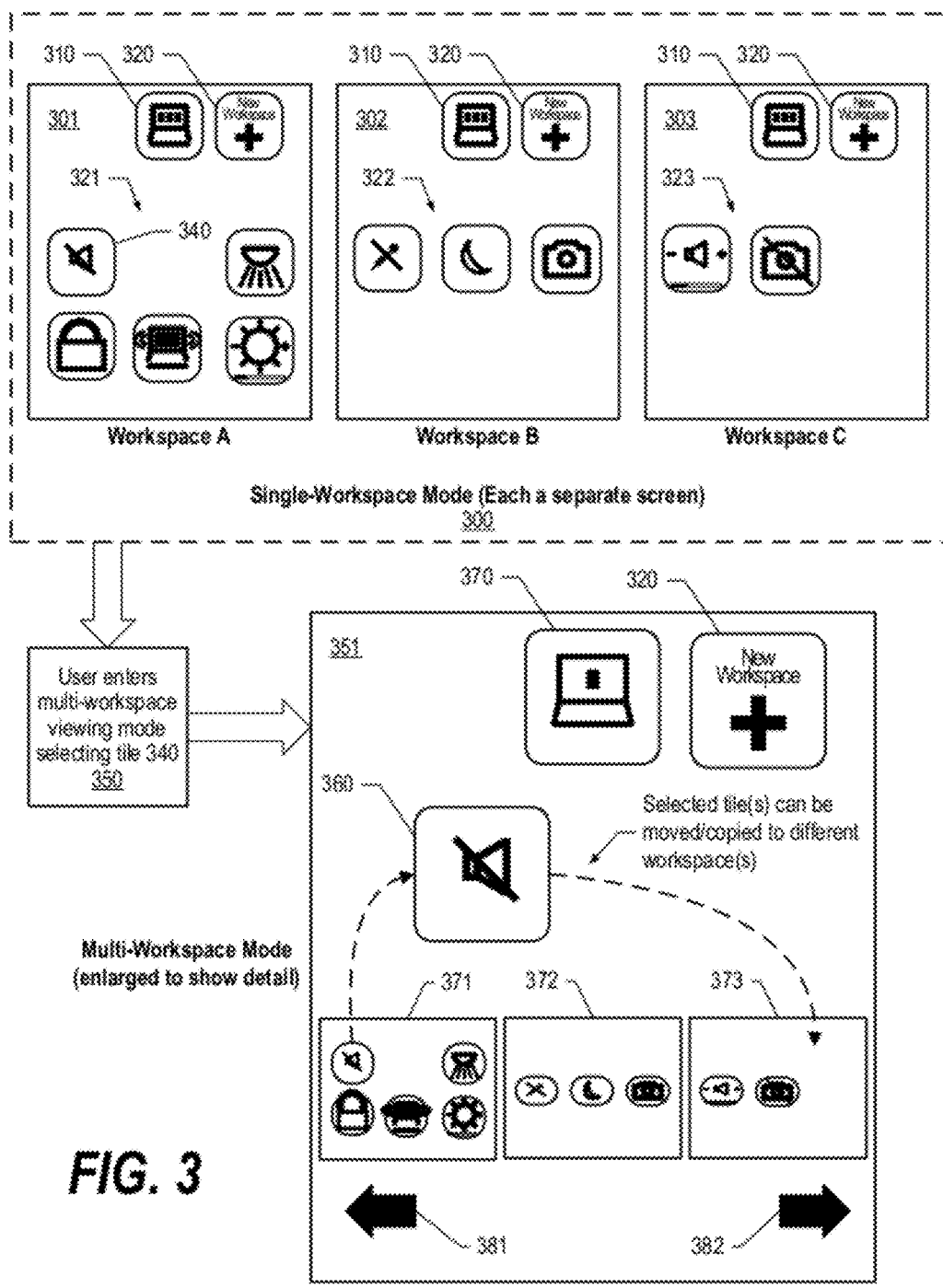
FIG. 3 is a diagram showing a user entering a multi-workspace view from a single workspace view and selecting a tile that the user wishes to move from one workspace to another workspace.

FIG. 3 is a diagram showing a user entering a multi-workspace view from a single workspace view and selecting a tile that the user wishes to move or copy from one workspace to another workspace. As used herein, the term "directing" refers to moving or copying items, such as tiles, from one workspace to another. In one embodiment, the directing can be performed in response to the user's selection. Workspaces 300 shows three different workspaces (301, 302, and 303). While in single-workspace mode, the user navigates between workspaces by scrolling, usually facilitated by a left-right scroll mechanism that is user-selected using a gesture (e.g., sliding finger across workspace page from left to right or right to left, etc.) or by using a left or right icon. In workspaces 300, the gesture mechanism is employed as the left/right icons do not appear. One or more tiles appears in each of the single-workspaces (tiles 321 appearing in workspace 301, tiles 322 appearing in workspace 302, and tiles 323 appearing in workspace 303). While three workspaces are shown for illustrative purposes, any number of single workspaces can be included only as limited by the information handling system capabilities of the underlying system and operating software. In one embodiment, two workspace tiles are included in each of the single workspace views—multi-workspace selector tile 310 and new workspace selector tile 320. While shown as tiles, the selection (request) of a multi-workspace view or a new workspace can also be handled by a gesture or other mechanism depending on the implementation in other embodiments. In addition, when entering the multi-workspace mode, the user selected one or more of the tiles (tile 340) that the user wishes to work with in multi-workspace mode. In one embodiment, the selection of tile 340 is made by the user selecting the selected tile (tile 340, e.g., by touching tile 340 with a finger using the touch-enabled screen, etc.) and then by selecting multi-workspace mode tile 310 (e.g., by single- or double-tapping tile 340, etc.). Process 350 depicts the machine entering the multi-workspace viewing mode from the single viewing mode of workspace A (301) after the user has selected tile 340. The selection of multi-workspace mode tile 310 results in multi-workspace mode 351 being displayed.

In multi-workspace mode 351, selected tile 340 from single-workspace mode screen 301 is displayed as a large selected tile (tile 360) in the multi-workspace mode. Note that if multiple tiles had been selected from single-workspace mode, each of the selected tiles would appear as a larger tile in multi-workspace mode 351. Multi-workspace tile 310 has been replaced by single-workspace tile 370 in the multi-workspace mode. In addition, new workspace tile 320 also appears. If the user selects new workspace tile 320, a new workspace is opened and displayed in the lower portion of the multi-workspace mode screen. In multi-workspace mode, several (e.g., three, four, etc.) of the single workspaces (e.g., single workspaces 301, 302, and 303, etc.) are displayed in a reduced size on the display screen. In the example, the set of reduced-sized single workspaces appear as workspaces 371, 372, and 373 in multi-workspace mode 351. In addition, similar to the scrolling capabilities provided in single workspace mode, multi-workspace mode allows scrolling using similar mechanisms (e.g., a right or left gesture) or by selecting left scroll icon 381 or right scroll icon 382. In one embodiment, when a scroll request is received in the multi-workspace mode, a different set of workspaces appear as reduced-sized workspaces (e.g., workspaces "D," "E," and "F" would appear in place of workspaces "A," "B," and "C," etc.). In other embodiments, a different number (e.g., one or two, etc.) of workspaces are scrolled when a scroll request is received while the system is in multi-workspace mode. In addition, the selected tile, or tiles (e.g., selected tile 360) remains visible while the scrolling takes place. In this manner, the user can select a tile from workspace "A," the selected tile will appear as selected tile 360, the user can scroll several times until another desired workspace appears (e.g., workspace "K" which is ten workspaces away from workspace "A", etc.) and then the user can select to move or copy the selected tile to the desired workspace by selecting the desired workspace when it becomes visible in the reduced workspace display.

As the name suggests, by selecting single-workspace tile 370, the system displays single workspace mode 300. In one embodiment, the individual single workspace that is displayed after single-workspace tile 370 is selected is the last workspace that was selected while in multi-workspace mode. To move or copy selected tile 360 to a different workspace, the user selects the desired workspace (e.g., workspace 370) after having selected the one or more tiles that the user wishes to move or copy. If the user did not select a tile (or tiles) to move while in single-workspace mode, then, while the system is in multi-workspace mode, the user can select the small tiles displayed in the reduced-sized workspaces (workspaces 371, 372, or 373) and this tile (or tiles) will appear as selected tile 360. In this manner, the user can remain in multi-workspace mode and select different sets of tiles to move/copy to different workspaces.

Figure 4:
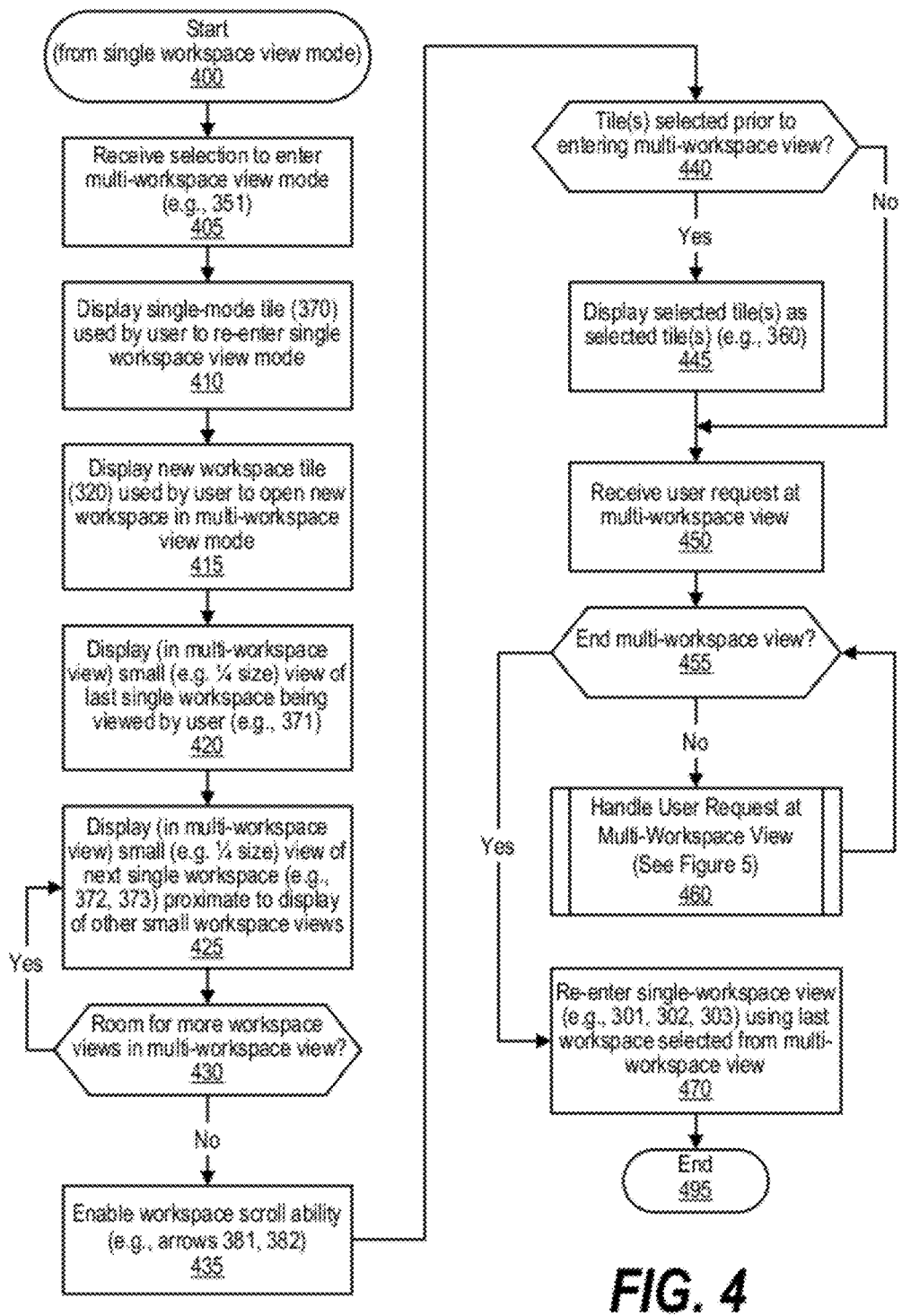
FIG. 4 is a flowchart showing the steps performed in entering the multi-workspace view and receiving user requests while in the multi-workspace view.

FIG. 4 is a flowchart showing the steps performed in entering the multi-workspace view and receiving user requests while in the multi-workspace view. Processing comments at 400 from single workspace mode where the user was viewing a single workspace. At step 405, a selection is received from the user to enter multi-workspace mode (e.g., by pressing multi-workspace mode tile 310 whereupon multi-workspace mode 351 appears, all as shown in FIG. 3). Returning to FIG. 4, a single workspace mode tile is displayed replacing the multi-workspace mode tile (e.g., single workspace mode tile 370 replaced multi-workspace mode tile 310 in FIG. 3). The single workspace mode tile is selected by the user when the user wishes to return to single workspace mode and view a single workspace at a time.

At step 415, new workspace tile continues to be displayed and this tile is selected by the user to open a new workspace while working in the multi-workspace mode (see new workspace tile 320 in multi-workspace mode 351 shown in FIG. 3). At step 420, a small version (e.g., one-quarter size, etc.) of a first workspace is rendered and displayed in the multi-workspace mode (e.g., see workspace 371 within multi-workspace mode 351 shown in FIG. 3). At step 425, a second workspace is also rendered and displayed in the multi-workspace mode also at the reduced size (e.g., see workspace 372 within multi-workspace mode 351 shown in FIG. 3). A decision is made as to whether the display screen has enough room to display more workspaces in the multi-workspace mode (decision 430). While at least two workspaces are shown in the multi-workspace mode, the actual number of workspaces that are displayed depends in part on the display resolution, display characteristics, etc. of the display screen. If there is enough room to render more workspaces in the multi-workspace mode, then decision 430 branches to the "yes" branch which loops back to select the third workspace (e.g., see workspace 373 within multi-workspace mode 351 shown in FIG. 3) and continues to loop back until no more workspaces will fit in the allocated space within the multi-workspace mode screen.

After the reduced sized workspaces are rendered as will fit on the allocated portion of the display, then decision 430 branches to the "no" branch whereupon, at step 435, multi-workspace scroll ability is enabled to allow the user to scroll between various sets of workspaces that are visible in the multi-workspace mode. In one embodiment, as shown in FIG. 3, the scroll ability is shown by the inclusion of arrow icons 381 and 382 which are selectable by the user to scroll left or right through the workspaces. In another embodiment, a gesture, such as swiping a finger or thumb horizontally across the touch-enabled display is used to receive the scroll request.

A decision is made as to whether the user selected one or more tiles prior to entering the multi-workspace mode (decision 440). If one or more tiles had been selected, then decision 440 branches to the "yes" branch whereupon, at step 445, the selected tiles are displayed (e.g., see selected tile 360 in FIG. 3). On the other hand, if the user did not select at least one tile before entering the multi-workspace mode, then decision 440 branches to the "no" branch bypassing step 445.

At step 450, a request is received from the user while the user is using the multi-workspace mode. A decision (decision 455) is made as to whether the user has requested to end the multi-workspace mode, such as by selecting the single mode icon (see single-workspace mode tile 370 within multi-workspace mode 351 shown in FIG. 3). If the user's request was not to end the multi-workspace mode, then decision 455 branches to the "no" branch whereupon, at predefined process 460, the user request is handled while the system is operating in the multi-workspace mode (see FIG. 5 and corresponding text for processing details). Processing then loops back to receive and process the next user request. This looping continues until the user requests to end the multi-workspace mode, at which point decision 455 branches to the "yes" branch whereupon, at step 470, the single workspace mode is re-entered. In one embodiment, the workspace that is displayed when returning to the single workspace mode is the last workspace that was selected when the user was using the multi-workspace view. Processing thereafter ends at 495.

Figure 5:
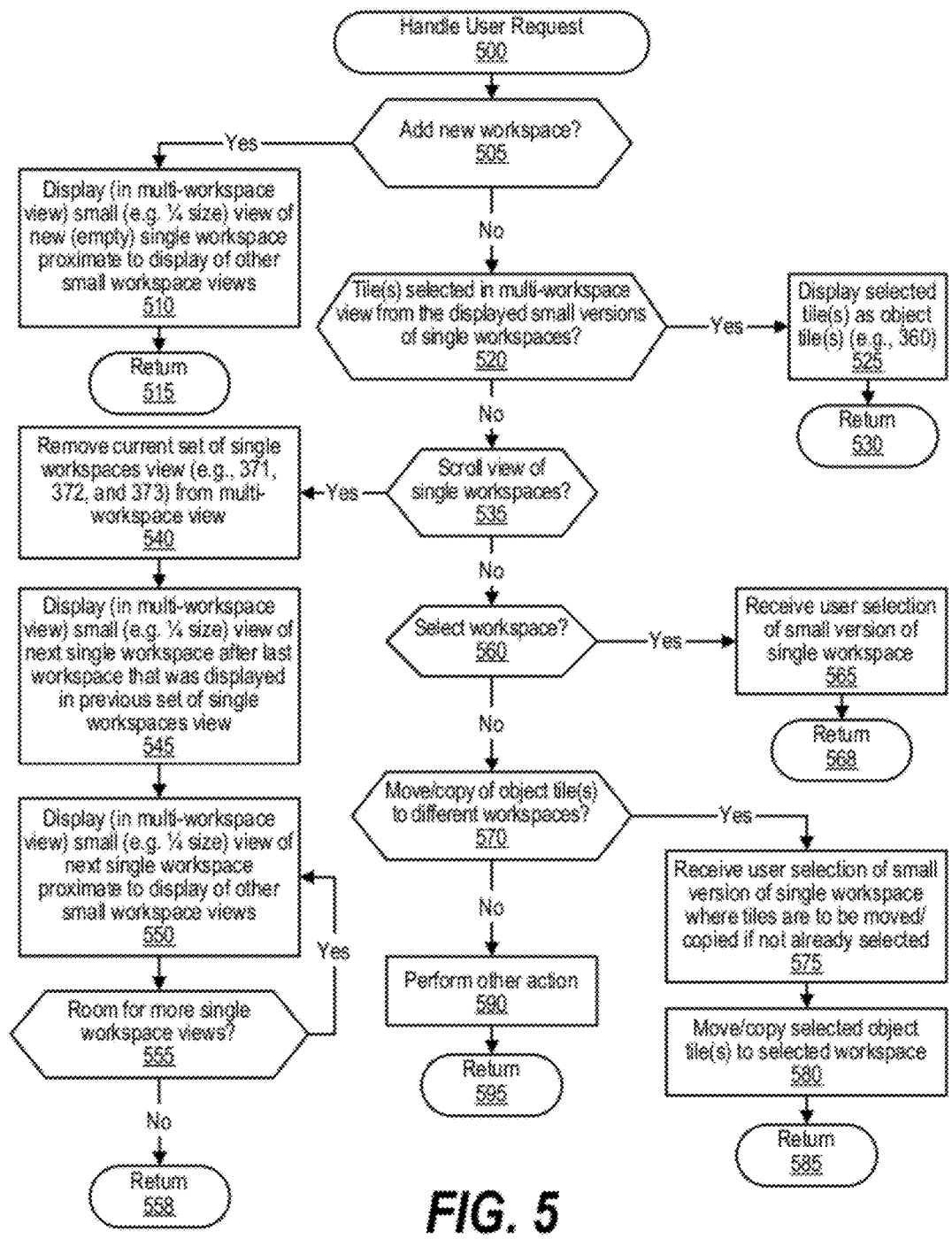
FIG. 5 is a flowchart showing the steps performed to handle user requests received while the user is in the multi-workspace view.

FIG. 5 is a flowchart showing the steps performed to handle user requests received while the user is in the multi-workspace view. Processing commences at 500 whereupon a decision is made as to whether the user requested to add a new workspace (e.g., by selecting new workspace tile 320 shown in FIG. 3). If the user requested to add a new workspace, then decision 505 branches to the "yes" branch whereupon, at step 510, a new workspace is displayed in a reduced-sized rendering in the workspaces area of the multi-workspace mode. The new (empty) single workspace is shown proximate to the other reduced sized workspaces that are displayed in the multi-workspace mode. Additionally, one of the previously displayed workspaces may no longer appear in the multi-workspace mode to make room to display the new (empty) workspace. Processing thereafter returns at 515.

On the other hand, if the request was not to add a new workspace, then decision 505 branches to the "no" branch whereupon a decision is made as to whether the user request was a selection of one or more tiles from the workspaces that appear in the multi-workspace mode (decision 520). If the request was a selection of tiles from these workspaces, then decision 520 branches to the "yes" branch whereupon, at step 525, the selected tiles are displayed as object tiles (selected tiles) within the multi-workspace mode (see tile 360 as it appears in multi-workspace mode 351 in FIG. 3). Processing thereafter returns at 530.

Returning to decision 520, if the user request was not to select tiles, then decision 520 branches to the "no" branch whereupon a decision is made as to whether the user request was to scroll the set of reduced-sized single workspaces that appear in the multi-workspace view (decision 535). If the request was to scroll the view of single workspaces, then decision 535 branches the "yes" branch whereupon, at step 540, the current set of reduced-sized single workspaces (e.g., workspaces 371, 372, and 373 from multi-workspace mode 351 in FIG. 3) are removed. At step 545, a small version (e.g., one-quarter size, etc.) of the next workspace after the last workspace that was previously displayed is rendered and displayed in the multi-workspace mode. At step 550, a second (next) workspace is also rendered and displayed in the multi-workspace mode also at the reduced size (e.g., see workspace 372 within multi-workspace mode 351 shown in FIG. 3). A decision is made as to whether the display screen has enough room to display more workspaces in the multi-workspace mode (decision 555). While at least two workspaces are shown in the multi-workspace mode, the actual number of workspaces that are displayed depends in part on the display resolution, display characteristics, etc. of the display screen. If there is enough room to render more workspaces in the multi-workspace mode, then decision 555 branches to the "yes" branch which loops back to select the third workspace and continues to loop back until no more workspaces will fit in the allocated space within the multi-workspace mode screen. After the reduced sized workspaces are rendered as will fit on the allocated portion of the display, then decision 555 branches to the "no" branch whereupon processing returns at 558.

Returning to decision 535, if the request is not to scroll through the single workspaces that appear in the multi-workspace mode, then decision 535 branches to the "no" branch whereupon a decision is made as to whether the request is to select a workspace that appears in the multi-workspace mode (decision 560). If the request is to select one of the workspaces that appear in the multi-workspace mode, then decision 560 branches to the "yes" branch whereupon, at step 565, the user selection of the reduced sized single workspace that appears in the multi-workspace mode is received and retained. Processing then returns at 568.

Returning to decision 560, if the request was not a workspace selection, then decision 560 branches to the "no" branch whereupon a decision is made as to whether the request is to move or copy selected tiles to a selected workspace (decision 570). If the request is to move or copy selected tiles to a selected workspace, then decision 570 branches to the "yes" branch whereupon, at step 575, the user selection of the single workspace that is displayed in the multi-workspace mode is received (if the user did not already provide the selection as described by step 565 above). At step 580, the selected tile or tiles are moved or copied, as requested by the user. In one embodiment, a different gesture is used to move tiles rather than copy tiles. For example, a single tap of a workspace could be the gesture used to request that the selected tile (or tiles) be moved to the workspace while a different gesture, such as a double-tap, could be used to request that the selected tile (or tiles) be copied to the workspace. Processing thereafter returns at 585.

Returning to decision 570, if the user did not request to move or copy the tile or tiles, then decision 570 branches to the "no" branch whereupon some other request is performed and then processing returns to the calling routine at 595.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The invention claimed is:

1. A method comprising:
   displaying a multi-workspace mode on a display screen, wherein the displaying of the multi-workspace mode comprises displaying a plurality of single workspaces on the display screen;
   displaying, in the multi-workspace mode, at least a first tile on a first single workspace;
   receiving a first selection of at least the first tile displayed on the first single workspace;
   in response to receipt of the first selection, displaying the at least first tile apart from any single workspace displayed in the multi-workspace mode;
   receiving a workspace selection corresponding to a workspace of the plurality of single workspaces, the workspace selection received while the first selection of the first tile is still pending; and
   directing the at least first tile to the workspace corresponding to the workspace selection.

2. The method of claim 1 further comprising:
   after displaying the multi-workspace mode, receiving one or more scroll requests wherein each scroll request is performed by displaying a set of single workspaces on the display screen while continuing to display the at least first tile, and wherein the workspace selection is received after the receiving of the one or more scroll requests.

3. The method of claim 1 further comprising:
receiving a new workspace request while displaying the multi-workspace mode and in response to selection of a second tile;
opening a new workspace; and
displaying the new workspace as one of the set of single workspaces on the display screen.

4. The method of claim 1, wherein the at least first tile as displayed in the multi-workspace mode apart from any single workspace is displayed larger than at least one tile displayed on at least one of the plurality of single workspaces displayed in the multi-workspace mode.

5. The method of claim 1, wherein the at least first tile as displayed in the multi-workspace mode apart from any single workspace is displayed larger than any tile displayed on at least one of the plurality of single workspaces displayed in the multi-workspace mode.

6. The method of claim 1, wherein the at least first tile as displayed in the multi-workspace mode apart from any single workspace is displayed to encompass an area at least half the size of any area on which one of the plurality of single workspaces are displayed.

7. The method of claim 1, comprising:
receiving, in the multi-workspace mode, a selection of at least the first tile and a second tile displayed on one or more single workspaces;
in response to receipt of the selection, displaying the first and second tiles in the multi-workspace mode apart from any single workspace displayed in the multi-workspace mode; and
directing the first and second tiles to the workspace corresponding to the workspace selection.

8. The method of claim 1, further comprising:
displaying a single workspace mode which comprises a second tile selectable to display the multi-workspace mode, wherein the second tile includes an image of a computer thereon, the image of the computer including at least a portion with plural workspaces displayed on the portion to represent that the second tile pertains to the multi-workspace mode.

9. An information handling system comprising:
one or more processors;
a memory coupled to at least one of the processors;
a display screen accessible by at least one of the processors; and
a set of computer program instructions stored in the memory and executable by at least one of the processors in order to:
display a multi-workspace mode on the display screen, wherein the displaying of the multi-workspace mode comprises displaying a plurality of single workspaces on the display screen;
display, in the multi-workspace mode, at least a first tile on a first single workspace;
receive a first selection of at least the first tile displayed on the first single workspace;
in response to receipt of the first selection, display the at least first tile in the multi-workspace mode apart from any single workspace displayed in the multi-workspace mode;
receive a workspace selection corresponding to a workspace of the plurality of single workspaces, the workspace selection received without also receiving a subsequent selection of the first tile; and
in response to receipt of the workspace selection, direct the at least first tile to the workspace corresponding to the workspace selection.

10. The information handling system of claim 9 wherein the set of computer program instructions are executable by at least one of the processors to:
after display of the multi-workspace mode, receive one or more scroll requests wherein each scroll request is performed by displaying a set of the plurality of single workspaces on the display screen while continuing to display the at least first tile, wherein the workspace selection is received after the receiving of the one or more scroll requests.

11. The information handling system of claim 9 wherein the set of computer program instructions are executable by at least one of the processors to:
receive a new workspace request while displaying the multi-workspace mode;
open a new workspace; and
display the new workspace as one of the set of single workspaces on the display screen.

12. The information handling system of claim 9, wherein a single workspace mode tile is displayed in the multi-workspace mode that is selectable to display a single workspace mode, and wherein the single workspace mode tile is displayed apart from the plurality of single workspaces displayed in the multi-workspace mode such that it is not a tile included in one of the plurality of single workspaces displayed in the multi-workspace mode.

13. The information handling system of claim 9, wherein the at least first tile as displayed in the multi-workspace mode apart from any single workspace is displayed larger than at least one tile displayed on at least one of the plurality of single workspaces displayed in the multi-workspace mode.

14. The information handling system of claim 9, wherein the at least first tile as displayed in the multi-workspace mode apart from any single workspace is displayed larger than any tile displayed on any of the plurality of single workspaces displayed in the multi-workspace mode.

15. The information handling system of claim 9, wherein the instructions are executable to:
receive, in the multi-workspace mode, a selection of at least the first tile and a second tile displayed on one or more single workspaces;
in response to receipt of the selection, display the first and second tiles in the multi-workspace mode apart from any single workspace displayed in the multi-workspace mode; and
direct the first and second tiles to the workspace corresponding to the workspace selection.

16. A non-transitory computer readable storage medium (CRSM), the CRSM comprising instructions executable by processor to:
display a multi-workspace mode on a display screen, wherein the displaying of the multi-workspace mode comprises displaying a plurality of single workspaces on the display screen;
display, in the multi-workspace mode, at least a first tile on a first single workspace;
receive a first selection of at least the first tile displayed on the first single workspace;

in response to receipt of the first selection, display the at least first tile in the multi-workspace mode apart from any single workspace displayed in the multi-workspace mode;

receive a workspace selection corresponding to a workspace of the plurality of single workspaces, the workspace selection received while the first selection of the first tile is still pending and without receiving a subsequent selection of the first tile; and direct the at least first tile to the workspace corresponding to the workspace selection.

17. The CRSM of claim 16, wherein the instructions are executable by the processor to:

after display of the multi-workspace mode, receive one or more scroll requests wherein each scroll request is performed by displaying a set of single workspaces on the display screen while continuing to display the at least first tile, wherein the workspace selection is received after the receiving of the one or more scroll requests.

18. The CRSM of claim 17, wherein the workspace selection of one of the set of the single workspaces corresponds to a single workspace that did not appear prior to the scrolling.

19. The CRSM of claim 16, wherein the instructions are executable by the processor to:

receive a new workspace request while displaying the multi-workspace mode;

open a new workspace; and display the new workspace as one of the set of single workspaces on the display screen.

20. The CRSM of claim 16, wherein at least one of the single workspaces is presentable in a single workspace mode such that, when presented in the single workspace mode, the at least one single workspace includes a new workspace tile selectable to create a new workspace.

21. A method comprising:

displaying a multi-workspace mode on a display screen, wherein the displaying of the multi-workspace mode comprises displaying a plurality of single workspaces on the display screen;

displaying, in the multi-workspace mode, at least a first tile on a first single workspace;

receiving a first selection of at least the first tile displayed on the first single workspace;

in response to receipt of the first selection, displaying the at least first tile in the multi-workspace mode apart from any single workspace displayed in the multi-workspace mode;

subsequent to displaying the first tile in the multi-workspace mode apart from any single workspace displayed in the multi-workspace mode, receiving a workspace selection corresponding to a workspace of the plurality of single workspaces, the workspace selection received without receiving a second selection of the first tile subsequent to the first selection of the first tile; and directing the at least first tile to the workspace corresponding to the workspace selection.

* * * * *